O. KELL.
FISH SCALING DEVICE.
APPLICATION FILED JULY 31, 1911.
1,028,736.
Patented June 4, 1912.
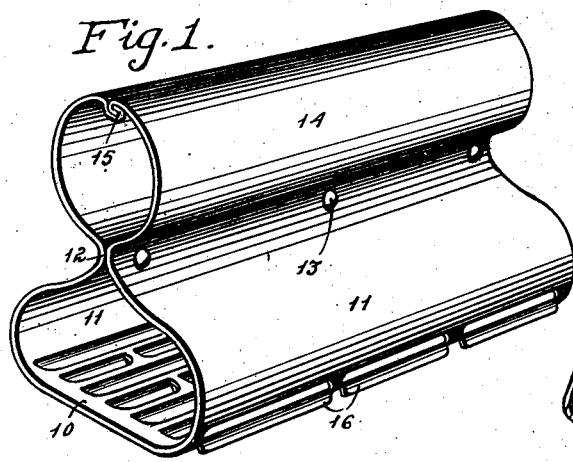
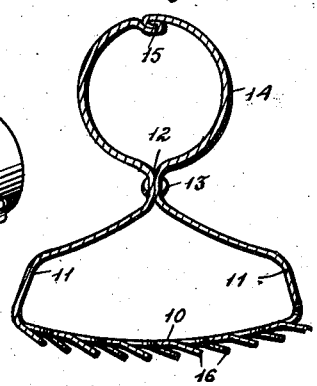
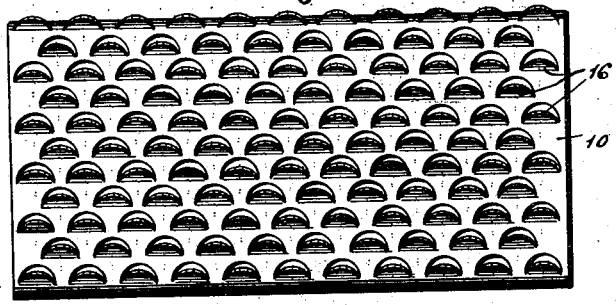
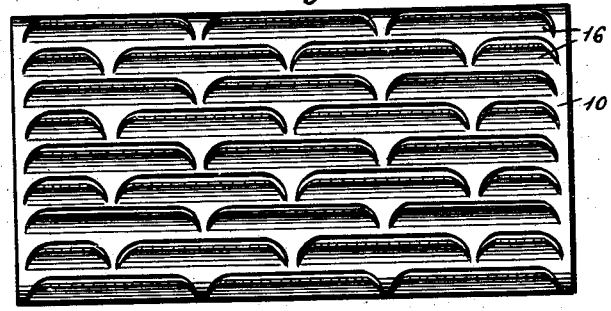
Witnesses.
W. A. Loftus.
A. G. Hague.
Inventor.
Otto Kell.
by J. Ralph Druig, Atty.

UNITED STATES PATENT OFFICE.

OTTO KELL, OF DES MOINES, IOWA.

FISH-SCALING DEVICE.

1,028,736.

Specification of Letters Patent. Patented June 4, 1912.

Application filed July 31, 1911. Serial No. 641,598.

*To all whom it may concern:*

Be it known that I, OTTO KELL, a citizen of the United States, residing at Des Moines, in the county of Polk and State of Iowa, have invented a certain new and useful Fish-Scaling Device, of which the following is a specification.

The object of my invention is to provide a device of simple and inexpensive construction, designed to be used in removing scales from fish.

More specifically it is my object to provide an improved fish scaling device constructed of a single piece of material having lugs formed at the bottom thereof, and arranged in rows, said lugs being designed to engage the scales of the fish to be cleaned, and thereby remove the scales when the device is moved in proper direction over the fish.

My invention consists in certain details, in the construction, arrangement and combination of the various parts of the device, whereby the objects contemplated are attained, as hereinafter more fully set forth, pointed out in my claim and illustrated in the accompanying drawings, in which—

Figure 1 shows a perspective view of one form of my device, the scale removing lugs therein shown, being substantially rectangular in shape. Fig. 2 shows a bottom view of the same. Fig. 3 shows a vertical, transverse, central sectional view of a slightly modified form of my invention, the lugs therein shown, being semi-circular in shape, and Fig. 4 shows a bottom view of the form shown in Fig. 3.

Referring to the accompanying drawings it will be seen that the forms of my device therein shown, are constructed of a single piece, preferably of sheet metal bent and riveted together at certain points to give it the desired shape.

The device comprises a bottom portion 10 curved upwardly to form side members 11. The side members are extended inwardly and connected to each other at 12, by means of rivets 13, or the like, to thereby add strength and rigidity to the device. The side members are then extended upwardly and formed into a cylindrical handle 14, of a convenient size and shape to fit the operator's hand. The ends of the sheet metal are then connected together at 15.
Formed on the bottom portion 10, at intervals, is a plurality of lugs 16 arranged in rows and staggered, said lugs being extended downwardly, and at an acute angle to the bottom portion. These lugs are constructed integrally with the bottom portion and are preferably formed by being stamped out of the material of the bottom portion.

It is obvious that when the operator moves the device over the fish to be scaled, in a direction opposite to that in which the scales extend, the downwardly extending lugs will engage the scales of the fish in such a manner as to quickly and easily remove the scales. On account of the lugs being extended downwardly, and at the proper angle to engage the scales of the fish, it is not necessary for the operator to tilt the device in any manner when scaling a fish, and the danger of cutting into the flesh of the fish is thereby eliminated.

My purpose for arranging the lugs on my device staggeredly is to have them conform, in as far as possible, with the arrangement of the scales on a fish, and thereby each lug will engage but one scale at a time and the scales will be removed in their successive order. Furthermore there being several rows of lugs arranged on the bottom of each device it is obvious that it will require but a very small number of strokes of the device to thoroughly remove all of the scales from a fish.

A further advantage gained, by arranging the lugs as shown, is in providing the device with the greatest possible number of scale removing members and at the same time not materially lessening the strength of the device, nor in any way adding to its weight.

It will also be noticed that I have provided a way in which the fish scales will be retained within the device, thereby eliminating one of the most objectionable features in cleaning a fish, due to the fact that when a knife or some form of straight blade is used, the scales will be scattered about over a considerably large area.

When my device is employed, it is obvious, that the scales removed by each of the downwardly extending lugs will be scooped upwardly on the lugs and into the interior of the body portion through the adjacent openings.

I claim as my invention:

A fish scaling device, comprising a base provided with inclined lugs on its lower surface and with openings adjacent to each lug respectively designed to permit scales removed by the lugs to pass through said base, upwardly and inwardly extending sides secured together at a point spaced apart from the base to leave a space above the base open at both ends, said sides being further extended in substantially cylindrical form to constitute a handle.

Des Moines, Iowa, July 24, 1911.

OTTO KELL.

Witnesses:
M. WALLACE,
M. PETERSON.